United States Patent [19]
Knize

[11] 3,823,967
[45] July 16, 1974

[54] CLIP FOR A CAN OR CONTAINER
[75] Inventor: Elmer J. Knize, Chicago, Ill.
[73] Assignee: Lippy Can Co., Ltd., Chicago, Ill.
[22] Filed: Dec. 20, 1972
[21] Appl. No.: 316,770

[52] U.S. Cl. .............................................. 292/258
[51] Int. Cl............................................ B65d 45/30
[58] Field of Search .......... 292/253, 258, 288, 256, 292/DIG. 11; 24/73 AC, 73 B, 73 CF, 73 HL; 220/55

[56] References Cited
UNITED STATES PATENTS
| | | | |
|---|---|---|---|
| 1,954,491 | 4/1934 | Rollason | 292/253 |
| 2,695,806 | 11/1954 | Balint | 292/258 |
| 2,743,128 | 4/1956 | Hawkswell et al. | 292/258 |
| 3,035,860 | 5/1962 | Bradner | 292/258 |
| 3,613,177 | 10/1971 | Davis | 24/73 B |

FOREIGN PATENTS OR APPLICATIONS
| | | | |
|---|---|---|---|
| 381,041 | 9/1923 | Germany | 292/253 |

Primary Examiner—Joseph H. McGlynn
Assistant Examiner—Richard P. Tremblay
Attorney, Agent, or Firm—Max R. Kraus

[57] ABSTRACT

A clip for detachable securement to a lid and a can or container for the purpose of retaining said lid locked with respect to said container, said container having a rim having a generally inverted U-shaped portion extending inwardly of the wall of the body of the container and upwardly thereof, with a lid having an inverted U-shaped portion which seats over the correspondingly shaped portion of the rim and with the clip comprising an integrally formed strip shaped to form a U-shaped inner end and an inwardly turned outer end, with an intermediate humped portion. The clip is applied so that the inner leg of the U-shaped inner end tangentally engages the curved U-shaped portion of the lid and applies an inward and downward force or pressure against that portion of the lid to hold same in locked position relative to said rim.

6 Claims, 3 Drawing Figures

PATENTED JUL 16 1974

3,823,967

3,823,967

CLIP FOR A CAN OR CONTAINER

BRIEF SUMMARY OF THE INVENTION

One of the principle objects of this invention is to provide a clip which will effectively secure the lid to the rim of a container, which lid and rim are described in my copending application Ser. No. 294,937 filed Oct. 4, 1972, now Pat. No. 3,799,388, issued Mar. 26, 1974, wherein the rim has an inverted U-shaped portion which extends above the top plane of the body of the container, with the lid having a similar U-shaped portion which seats on the U-shaped portion of the rim, and wherein the clip has an inner end shaped to receive a tool such as a screwdriver or the like, the clip being so shaped and secured to the container and lid that the inner end of the clip tangentally engages the curved bend of the lid, with the opposite end of the lid engaging the bead of the container, which bead is on a horizontal plane lower than the plane of the tangental engagement so that the clip applies a tangental force or pressure against the uppermost portion of the lid in a downward direction to hold the lid secured to the rim. When once applied the clip cannot be removed therefrom without the use of a tool and a force applied to the tool in such a manner as to lift the inner end of the clip from the lid.

Another object of this invention is to provide a clip which is economical to produce and which is highly effective in retaining the lid on the rim of the container.

Figures 1, 2, 3:
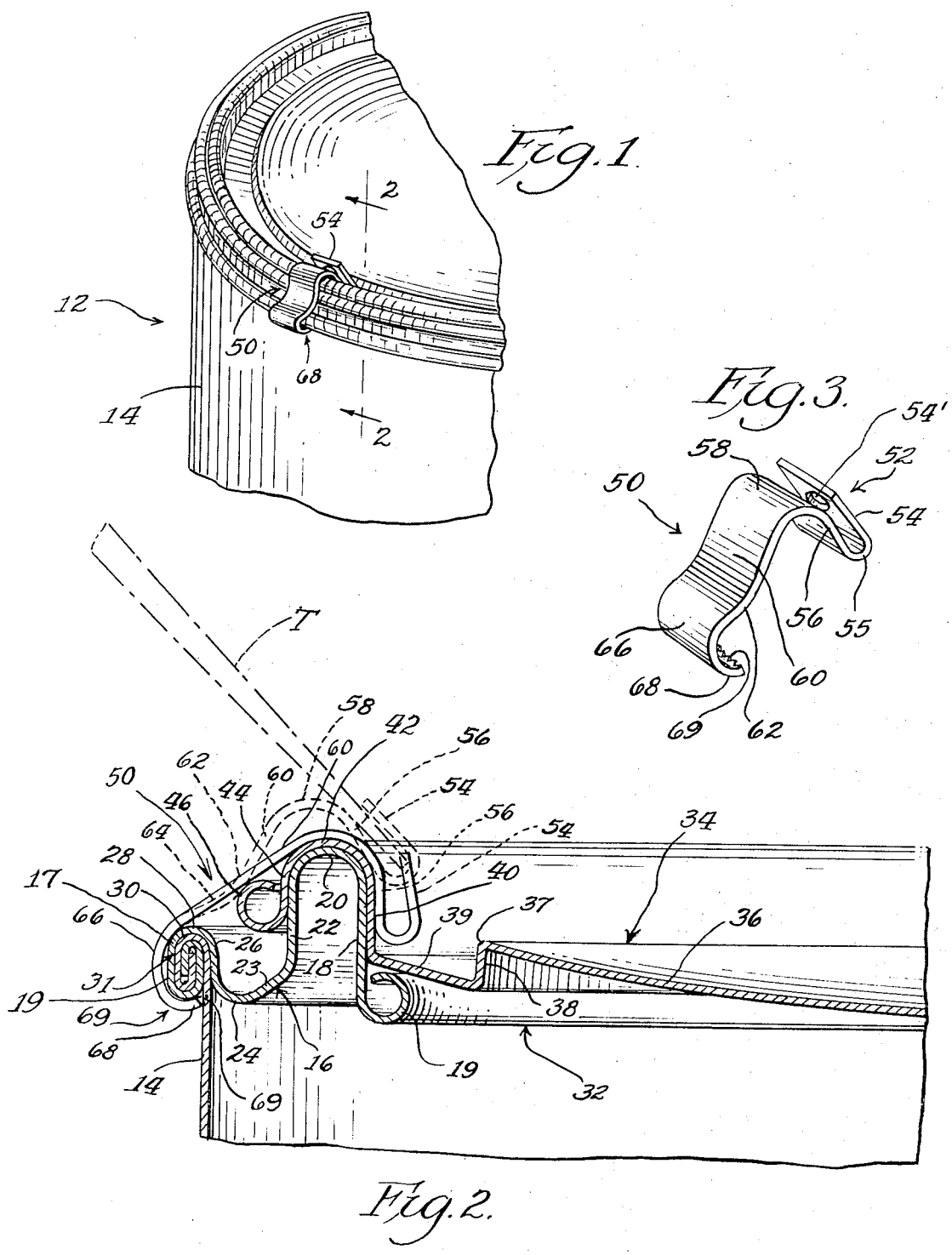
FIG. 1 is a perspective view of a portion of a can or container and lid secured by means of the clip forming this invention.
FIG. 2 is an enlarged sectional view taken on line 2—2 of FIG. 1 and showing in dotted lines the insertion of a tool such as a screwdriver and the position of the clip when being pried off.
FIG. 3 is a perspective view of the clip forming this invention.

The top rim of the can and lid forms the subject matter of a copending application and will be briefly described herein as the clip forming this invention has particular adaptability for said type of can and lid.

The can or container, generally indicated by the numeral 12, comprises a circular body 14 provided with the usual bottom (not shown). The top rim 16 is secured to the top of the can body as at 17 in the conventional manner. The rim 16 is of circular shape and is formed to comprise an inner vertical wall 18 which terminates at its lower end in an inner rolled bead 19. The upper portion of the vertical wall 18 of the rim is curved or arcuate-shaped to form a rolled top surface 20 which continues downwardly, with an outer spaced vertical wall 22 which angles or inclines outwardly at the bottom as at 23 and which continues laterally with a horizontal bottom section 24, which continues vertically upwardly to form a spaced vertical wall 26, which then continues outwardly to form a rolled top surface 28 to receive therewithin the rolled upper edge 30 of the body of the container to form a conventional interlocking bead 31 which interlocks the rim 16 to the body of the container.

The inner vertical wall 18 of the rim is adjacent the central can opening 32. The rolled top surface 20 extends above the plane of any other portion of the rim.

The lid 34 is of circular shape and comprises a main central concave or dish-shaped portion 36 which continues upwardly to an annular peripheral edge 37 and then continues with an annular downwardly extending short peripheral wall portion 38 which is substantially vertical and the bottom of which then continues upwardly to form an upwardly and outwardly sloping planar intermediate wall portion 39 which is of annular shape and then continues upwardly to form a spaced inner vertical wall 40 which curves to form a rolled top portion 42 and then continues downwardly to form an outer wall 44 which terminates in an outwardly turned edge or bead 46. As shown best in FIG. 2, the rolled top portion 42 of the lid extends upwardly of the top concave or dish-shaped portion 36 of the lid. The angle or slope of the intermediate wall portion 39 is approximately 15° and the outer end of the wall 39 is immediately above the rolled bead 19.

The rolled portion 20 and the spaced vertical walls 18 and 22 of the rim form an inverted U-shaped configuration and the portion of the lid comprising the rolled top portion 42 and spaced vertical walls 40 and 44 likewise form an inverted U-shaped configuration, which may be termed the seating portion of the lid. As best seen in FIG. 2, the inverted U-shaped portion of the lid seats on and engages the inverted U-shaped portion of the rim. The rolled top portion 42 of the lid seats on and embraces the rolled top surface 20 of the rim, with the vertical wall 40 of the lid contiguous to and in engagement with the vertical wall 18 of the rim and the outer wall 44 of the lid is contiguous to and in engagement with the upper portion of the vertical wall 22 of the rim.

The foregoing is described and claimed in my copending application.

The clip which forms the subject matter of the present application is indicated generally by the numeral 50 and is formed of resilient material such as metal or the like and is shaped to form a generally U-shaped inner end 52 open at the top as well as the sides thereof. Said U-shaped end comprises an outer leg 54 which is curved at the bottom thereof as at 55 and then continues upwardly to form the inner leg 56 of the U-shaped inner end. The inner leg 56 continues upwardly above the top of the outer leg 54 and then is curved to form a hump or rounded portion 58 which then continues downwardly and outwardly at an angle as at 60 and then continues with another slight outward bend 62 and then continues outwardly in an inclined plane as at 64 and continues downwardly to form another hump or bend 66 with the end thereof turned or curved upwardly to terminate in an upwardly extending lip 68 adjacent the outer end 69 of the clip. The lip 68 has serrations or teeth 69.

The inner and outer legs 54 and 56 of the inner U-shaped end 52 are spaced from each other to define the generally U-shaped end configuration, however, while the outer leg 54 extends linearly, the inner leg 56 inclines inwardly in the direction of the outer leg from the bottom towards the top. The space in the U-shaped end is sufficient to accommodate a tool T such as a screwdriver or the like, as indicated by dotted lines in FIG. 2, when it is desired to remove the clip after it has served its purpose of retaining the lid on the container. The outer leg 54 has an opening 54' for receiving the end of a prying off tool if necessary.

FIGS. 1 and 2 show the clip 50 secured to the lid and to the bead of the container so that the clip retains the lid on the rim of the container against any accidental removal thereof. A number of such clips are spacedly secured around the top for detachably locking the lid to the container.

The clip 50 is applied to the lid and container by first engaging the outer end 69 of the clip with the bead 31 of the container and then pressing the opposite or inner end 52 of the clip over the inverted U-shaped portion of the lid. The lip 68 of the clip engages and hooks against the underside of the bead 31 with the teeth 69 gripping the adjacent surface, the humped or rounded portion 58 overlying the rolled top portion 42 of the lid and with the inner leg 56 of the inner end of the clip tangentally engaging the vertical wall 40 of the lid. The said overlying and tangental engagement is above the horizontal plane where the opposite end of the clip engages the bead of the container and the hump 58 of the clip is above the point of tangental engagement. This results in an inward and downward force or pressure against that portion of the lid which locks the lid to the rim of the container.

Since the clip is made of a metal or other material having resiliency there will be a certain amount of "give" to the clip as it is snapped over the lid and rim of the container. With the clip in the position shown in FIG. 2 to lock the lid to the rim, the clip could not be manually engaged without a tool to pry it from its locked position. The tangental pressure or force against the lid prevents it from being accidentally dislodged or manually removed without the aid of a tool. To remove the clip a tool T, as shown in dotted lines in FIG. 2, is inserted in the U-shaped end of the clip and the tool is pressed in the direction of the arrow shown in FIG. 2, to thereby apply a lifting pressure against the inner end of the clip and pry it away from engagement with the lid, shown in dotted lines in FIG. 2, to disengage the clip and permit its removal from the top of the container.

While a tool is necessary to remove the clip from the container, the clip may be manually applied without the use of a tool for the purpose of retaining the lid on the container.

What is claimed is:

1. A clip for a container and lid in which the container has a rim which has a raised inverted U-shaped portion extending inwardly of the side wall of the container and in which the lid has a seating portion which is of an inverted U-shape with an inner vertical wall, said inverted U-shaped portion of said lid seating on the inverted U-shaped portion of the rim, with the outer annular edge of the lid positioned inwardly of the side wall of the container; said clip being formed of resilient material and having an inner end which has a generally U-shaped configuration which includes an inner leg and an outer leg with the inner leg of the U-shaped inner end extending upwardly of the top of the outer leg and engaging the inner vertical wall of the lid along a substantial portion of the height of said inner vertical wall, said inner leg of said clip extending upwardly and then being bent to form a hump which extends over the inverted U-shaped portion of the lid and continuing downwardly and outwardly at an inclined angle and extending over the outer annular edge of the lid and terminating in a curved outer end which is adapted to encircle the exposed portion of the bead of the container, said inner end applying a downward and inward pressure or force against the lid to retain the lid on the rim.

2. A structure as set forth in claim 1 in which the inner leg of the inner end of the clip tangentially engages the inner vertical wall of the lid.

3. A structure as set forth in claim 1 in which the inner U-shaped end of the clip is adapted to receive a tool for the purpose of prying the clip from the lid and container.

4. A structure as set forth in claim 2 in which the tangental engagement is above the horizontal plane of the bead of the container.

5. A structure as set forth in claim 1 in which the outer end of the clip has a lip provided with a serrated surface.

6. A structure as set forth in claim 1 in which the outer leg of the U-shaped inner end of the clip has an opening for a prying-off tool.

* * * * *